United States Patent [19]

Luker et al.

[11] 4,402,093
[45] Sep. 6, 1983

[54] EMERGENCY VALVE UNIT FOR PREVENTING OVERFLOW OF A TOILET

[75] Inventors: Johnie N. Luker; Johnie D. Luker; David K. Luker, all of Culbertson, Nebr.

[73] Assignee: James F. Parker, Rowlett, Tex.

[21] Appl. No.: 374,829

[22] Filed: May 4, 1982

[51] Int. Cl.³ .................. E03D 11/00; E03C 1/242; F16K 21/18

[52] U.S. Cl. .......................................... 4/427; 4/415; 4/205; 4/661

[58] Field of Search ............... 4/427, 661, 415, 205; 251/203, 87

[56] References Cited

U.S. PATENT DOCUMENTS

| | | | |
|---|---|---|---|
| 1,090,200 | 3/1914 | Cole | 4/427 X |
| 1,224,974 | 5/1917 | Suelflohn | 4/427 |
| 1,430,586 | 10/1922 | Ramsdell et al. | 4/427 X |
| 1,458,373 | 6/1923 | Willman | 251/203 |
| 1,956,086 | 4/1934 | Tracy | 4/427 |
| 2,531,475 | 11/1950 | Sceroler | 4/427 X |
| 3,232,577 | 2/1966 | Sargent | 251/87 |
| 3,258,244 | 6/1966 | Hilton | 251/203 |
| 4,170,049 | 10/1979 | Gilliland | 4/427 |
| 4,203,173 | 5/1980 | Morris | 4/427 |
| 4,204,285 | 9/1980 | Pak | 4/661 X |
| 4,348,778 | 9/1982 | Rau | 4/661 |

FOREIGN PATENT DOCUMENTS 54-10546  1/1979  Japan ..................... 4/427

*Primary Examiner*—Henry K. Artis
*Attorney, Agent, or Firm*—Drude Faulconer

[57] ABSTRACT

An emergency valve unit which can be sold as a kit and which can be easily and quickly installed into typical, commercially-available toilets to prevent the bowl of the toilet from overflowing during the flushing thereof. The valve unit has a relatively thin, flat housing which is positioned between the water tank and the stool section of the toilet and is held there by the seam bolts that normally secure the tank to the stool. The housing has an opening therethrough which aligns with and forms a portion of the fluid passage between the tank and the stool. A valve element is slidably mounted in the housing and is manually movable to open or close said opening by means of a rod which extends from said housing. If at any time it appears that the toilet bowl is ready to overflow during a flushing operation, the rod can be pulled to close the valve unit thereby shutting off the flow of water from the tank to the bowl. Once the waste outlet of the bowl has been cleared, the rod is pushed to open the valve unit and routine operation of the toilet is resumed.

12 Claims, 5 Drawing Figures

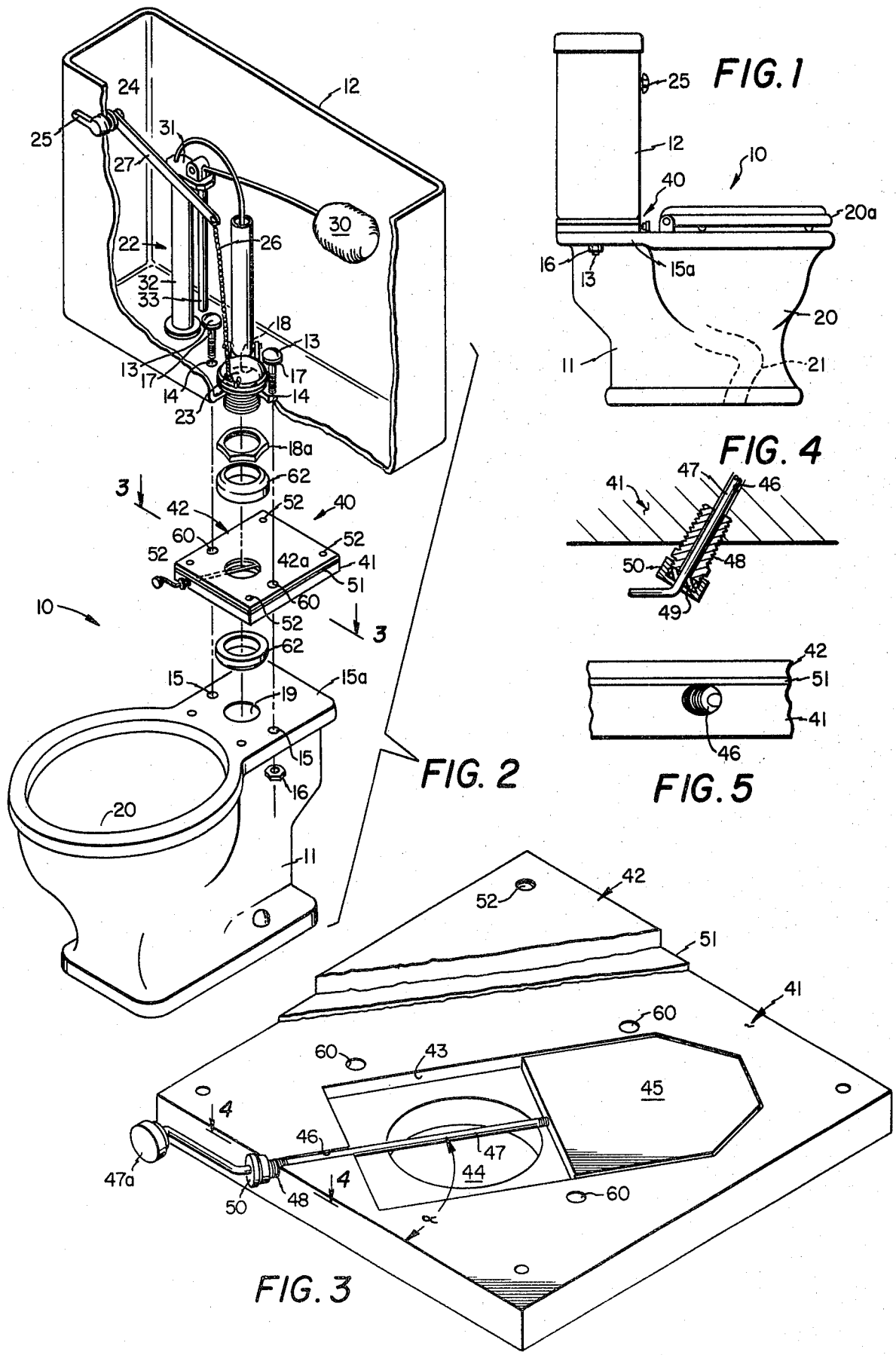

EMERGENCY VALVE UNIT FOR PREVENTING OVERFLOW OF A TOILET

BACKGROUND OF THE INVENTION

The present invention relates to a means for preventing the overflow of a toilet bowl during a flushing operation and more particularly relates to a valve unit that can easily be installed into a standard toilet and which can quickly be actuated during a flushing operation to prevent the toilet bowl from overflowing if the waste outlet of the bowl becomes clogged.

In the flushing operation of a standard toilet, a defined volume of water is flowed into the toilet bowl to flush the contents thereof out through a waste outlet in the bottom of the bowl. If this waste outlet becomes clogged or the downstream plumbing becomes blocked as commonly occurs from time to time in most toilets, the normal flow of water during flushing will unfortunately cause the bowl to overflow which, in turn, obviously creates an unpleasant situation.

To prevent overflow during flushing, several toilets have been specially designed to include a built-in, float-operated valve means which automatically shuts off the flow of water to the bowl if the water level in the bowl rises above a certain height. Examples of such toilets are disclosed in U.S. Pat. Nos. 1,430,586; 1,090,200; 1,956,086; 2,531,475; and 4,170,049. However, all of these toilets must be originally constructed to include special passages and chambers therein for the float-operated valve means and therefore must be purchased and installed as a complete unit. Since most toilets in use today are not so constructed, a need exists for an inexpensive means which can be easily installed into a standard toilet which can prevent overflowing when the bowl outlet becomes clogged.

SUMMARY OF THE INVENTION

The present invention provides an emergency valve unit that can easily and quickly be installed into a standard toilet and which can be manually operated to immediately shut off the flow of water to a toilet bowl to prevent overflow thereof.

The valve unit is positioned into the fluid passage between the water tank and the stool section of a standard toilet and can be closed to block flow through said passage. More specifically, the valve unit is comprised of a thin housing which is adapted to be slipped between the tank and the stool section and held in position by the bolts which normally secure the tank on the stool section. An opening through the housing is aligned with the tank outlet and the stool inlet passages when the unit is in position so water from the tank can flow through the valve when the valve is in an open position. A gate valve element is slidably mounted in the housing and is movable therein to manually open or close the opening through the housing by means of a rod which extends from the housing.

When it becomes obvious that the bowl outlet is clogged and that the bowl is about to overflow during a flushing operation, the rod is pulled forward for a short distance (e.g. 3 inches) to close the valve unit and shut off the flow of water to the bowl. The outlet can be unclogged without having the contents of bowl overflow onto the floor. When the bowl outlet has been cleared, the rod is simply pushed a short distance (e.g. 3 inches) to open the valve so normal operation of the toilet can be resumed.

BRIEF DESCRIPTION OF THE DRAWINGS

The actual construction, operation, and apparent advantages of the invention will be better understood by referring to the drawings in which like numerals identify like parts and in which:

FIG. 1 is a perspective view of a standard toilet in which the valve unit of the present invention is incorporated;

FIG. 2 is an exploded view, partly broken away, of the toilet and valve unit of FIG. 1;

FIG. 3 is a sectional view of the valve unit of the present invention taken along line 3—3 of FIG. 2;

FIG. 4 is a sectional view taken along line 4—4 of FIG. 3, and

FIG. 5 is a partial, front view of the assembled valve unit with the actuating rod and pipe nipple of FIG. 4 removed.

DESCRIPTION OF THE PREFERRED EMBODIMENT

Referring more particularly to the drawings, FIGS. 1 and 2 disclose a toilet 10 which has a construction which is representative of several commercially-available toilets in widespread use today. Toilet 10 is comprised of stool section 11 having a water tank 12 normally secured thereon by bolts 13 which, in turn, extend from the interior of tank 12, through holes 14 in the bottom of tank 12, and through holes 15 in flange 15a of stool section 11. Nuts 16 or the like are threaded onto bolts 13 and tightened to thereby fix tank 12 securely onto stool section 11. Gaskets 17 are provided for each bolt 13 to prevent leakage of water through holes 14.

As understood in the art, a defined volume of water is stored in tank 12 and is supplied to bowl 20 to flush the contents thereof through waste outlet 21 whenever flushing mechanism 22 is actuated. The water flows through a fluid passage which includes aligned tank outlet 18 (dotted lines in FIG. 2) and stool section inlet 19. Outlet 18 is flanged at the top to receive flapper valve 23. It is threaded on the bottom to receive locknut 18a.

Flushing mechanism 22 may be any of several known, commercially-available mechanisms. As illustrated, flushing mechanism is comprised of a flapper valve 23 which is pivotably movable between open and closed positions. When in a closed position, flapper valve 23 blocks flow through tank outlet 18. Rod 24 is rotatably and sealingly mounted through the front of tank 12 and has handle 25 affixed on the outer end and lever 27 affixed on the inner end. Chain 22 connects the free end of lever 27 to flapper valve 23.

When handle 25 is pushed down, lever 27 pulls chain 26 upward to open flapper valve 23 to allow the water in tank 12 to flow through outlet 18 into bowl 20 to flush the contents thereof through waste outlet 21. As the last of the water empties through outlet 18, flapper valve 23 automatically closes to allow tank 21 to refill. As the water level in tank 12 drops while flapper valve 23 is open, float 30 drops to open water inlet valve 31. Water flows into tank 12 through inlet pipe 32, valve 31, and outlet pipe 33. When flapper valve 23 closes, the rising level of water in tank 12 will move float 30 upward to shut off valve 31 when the defined volume of water has filled tank 12.

It can be seen from the above description of a typical flushing operation, the entire defined volume of water will flow into bowl 20 each time handle 25 is pushed downward. It follows that if waste outlet 21 becomes clogged or if the plumbing downstream thereof becomes blocked, the flow of the defined volume of water into bowl 20 will inherently cause the contents of bowl 20 to overflow onto the floor obviously resulting in very unpleasant consequences.

In accordance with the present invention, emergency valve unit 40 is provided which can be easily and quickly installed into toilet 10 wherein the flow of water from tank 12 into bowl 20 can be interrupted during a flushing operation to prevent overflow of bowl 20 whenever waste outlet 21 is clogged. A preferred construction of valve unit 40 is disclosed in FIGS. 3-4.

Valve unit 40 is comprised of a housing which, in turn, is comprised of a bottom plate section 41 and a top plate section 42. Channel 43 is provided in bottom plate 41 through which opening 44 is formed. Channel 43 is adapted to receive gate valve element 45 which, in turn, is adapted to slide within channel 43 to cover or uncover opening 44. Groove 46 is provided in bottom plate 41 and extends from one end of channel 43 to the outer edge of plate 41. An actuating rod 47 lies in groove 46 and is connected at one end to gate valve element 45. A pipe nipple 48 (FIG. 4) or the like is threaded into plate 41 at the entrance of groove 46 and has packing material 49 therein which surrounds rod 47. A packing nut 50 is threaded onto nipple 48.

Upper plate 42 is assembled onto lower plate 41 with gasket 51 (FIG. 2) therebetween and the unit 40 is secured together by means of screws 52 or the like. Plate 42 has an opening 42a therethrough which aligns with opening 44 in plate 41 and an opening (not shown) in gasket 51 when valve unit 40 is assembled to thereby provide a fluid passage through the housing. To better explain the construction and assembly of valve unit 40, a specific example of valve 40 will now be set forth which can be installed into a large number of standard toilets in use today which has a construction similar to that illustrated herein.

Plates 41, 42 of valve unit 40 are formed of brass or suitable plastic plates which are 7½ inch by 7½ inch squares. Channel 43 is formed on a 60 degree angle (i.e. angle in FIG. 3) into bottom plate 41 and is 6 inches long, 2½ inches wide, and 3/16 of an inch deep. Groove 46 which is 3/16 of an inch deep is formed in bottom plate 41 and a 2¼ inch diameter opening 44 is formed through the bottom of plate 41. A ¾ inch by ½ inch long pipe nipple 48, packing 49, and packing nut 50 is slipped onto ⅛ inch brass rod 47 which, in turn, is threaded at one end into gate valve element 45 which is 3 inches long, 2 7/16 inches wide, and ⅛ inch thick. The other end or rod 47 is bent at an approximate 135 degree angle. By forming channel 43 at an angle and bending rod 47 at a substantial angle, knob 47a (FIG. 3) will not strike the seat 20a of toilet 10 when knob 47a is pulled (e.g. approximately a distance of 3 inches) to close valve unit 40.

With nipple 48, packing 49, nut 50, and valve element 45 assembled on rod 47, rod 47 is laid into groove 46 with valve element 45 slidably positioned in channel 43. Nipple 48 is then threaded into plate 41 to secure rod 47 and valve element 45 to plate 41. It can be seen that rod 47 is slidable through nipple 48, packing 49, and nut 50 but packing 49 will prevent leakage around rod 47. If leakage occurs, nut 50 is tightened to further compress packing 49 which, in turn, will stop the leakage.

Upper plate 42 is positioned onto lower plate 41 with gasket 51 therebetween. As understood, gasket 51 is of a proper configuration and material (e.g. rubber) to prevent leakage from between plates 41, 42 when they are assembled. Plate 42 has a 2¼ inch opening 42a which aligns with opening 44 when the plates are assembled. Screws 52, or the like, secure valve unit 40 together. When unit 40 is assembled, it is approximately 1 inch thick. Three properly positioned, ¼ inch holes 60 are provided through plates 41, 42 as shown in FIGS. 2 and 3 for a purpose described below.

To assemble emergency valve unit 40 into toilet 10, the water supply is cut off and tank 12 is emptied of water. Nuts 16 are unthreaded from bolts 14 and tank 12 is lifted from stool section 11. With hacksaw or the like, water passage 18 is cut flush with bottom of locknut 18a. Valve unit 40 is slipped between tank 12 and stool section 11. Rubber gaskets 62 (FIG. 2) or the like are positioned below locknut 18a, and between tank 12 and the upper surface of valve unit 40 and between the lower surface of valve unit 40 and stool section 11 to surround openings 42a and 44, respectively to prevent leakage therefrom. Gaskets 62 are preferably rubber donut gaskets which are commercially available and which are installed with their respective flat sides against unit 40. Bolts 13 are positioned through holes 60 of valve unit 40 and holes 15 on stool section 11. Nuts 16 are again tightened onto bolts 13 to secure tank 12 and valve unit 40 onto stool section 11. In some toilets, a third bolt, 60a is added, thus requiring channel 43 to be cut on a 60° angle for proper clearances.

When valve unit 40 is assembled as described, openings 42a, 44 in plates 42, 41, respectively, are aligned with tank outlet 18 and stool inlet 19 so when valve 40 is open, water can easily flow from tank 12 to bowl 20 when toilet 10 is flushed. However, if waste outlet 21 becomes clogged and the level of water in bowl 20 begins to rise during flushing, knob 47a is pulled to slide gate valve element 45 over opening 44 in plate 41 to block flow therethrough thereby immediately stopping flow of water into bowl 20 and preventing the ultimate overflow of bowl 20. If the valve unit 40 is closed accidentally or by mistake, no harm will be done. The valve is merely opened and normal operation is resumed.

It can be seen from the above description, emergency valve unit 40 can be provided in the form of a kit which can easily be installed into most existing toilets. It should be understood that with only a minimum of modification (e.g. number and placement of mounting holes 60, size of opening 44, etc.), slightly differently configured valve units 40 can be made available commercially to fit slightly differently configured standard toilets.

What is claimed is:

1. In a typical, commercially-available toilet of the type having a stool section with a water tank secured thereon, said water tank being fluidly connected to a bowl in said stool section by means of a fluid passage, the improvement comprising:

an emergency valve unit positioned in said fluid passage and having an open position which allows flow through said passage and a closed position which blocks flow through said passage; said valve unit including:

means to manually move said valve unit to its open and closed positions.

2. The toilet of claim 1 wherein said emergency valve unit comprises:
- a housing which is positioned between said tank and said stool section, said housing having an opening therethrough which aligns with said fluid passage to form a part thereof;
- a valve element slidably mounted in said housing and movable between an open position which allows flow through said opening and a closed position which blocks flow through said opening; and
- an actuating rod connected at one end to said valve element and having its other end extending from said housing for manually moving said valve element to its open and closed position.

3. The toilet of claim 2 wherein said other end of said actuating rod is bent at a substantial angle to provide clearance in moving said valve element to its closed position.

4. The toilet of claim 2 wherein said housing has a relatively thin, flat configuration.

5. The toilet of claim 4 wherein said housing is approximately one inch thick.

6. The toilet of claim 4 wherein said housing includes:
- mounting holes therethrough, said holes positioned to receive the bolts which are normally used to secure said tank on said stool section of said typical toilet.

7. The toilet of claim 6 including:
- gasket means positioned between said valve unit and said water tank; and
- gasket means positioned between said valve unit and said stool section.

8. An emergency valve unit adapted to be installed into the fluid passage formed between the water tank and the stool section of a typical, commercially-available toilet, said emergency valve unit comprising:
- a housing adapted to be positioned between the water tank and the stool section of the toilet;
- an opening through said housing adapted to be aligned with and form a portion of said fluid passage when said valve unit is in an operable position between the tank and the stool section;
- a valve element slidably mounted in said housing and movable between an open position which allows fluid flow through said opening and a closed position which blocks fluid flow through said opening; and
- means connected to said valve element and extending from said housing for manually moving said valve element between its open and closed positions.

9. The emergency valve unit of claim 8 wherein said housing has a relatively thin, flat configuration.

10. The emergency valve unit of claim 9 wherein said housing is approximately one inch thick.

11. The emergency valve unit of claim 8 including:
- mounting holes through said housing positioned to receive the bolts normally used to secure the water tank on the stool section of the typical toilet when said valve is in an operable position.

12. The emergency valve unit of claim 11 wherein said housing comprises:
- a lower plate having a channel formed therein and an opening formed through the bottom of said channel;
- an upper plate secured to said bottom plate and having an opening therethrough which is aligned with said opening in said channel; and
- means between said upper and lower plates to prevent leakage therebetween;

and wherein said valve element comprises:
- a gate valve element slidably positioned in said channel and movable between said open and closed positions;

and wherein said means for manually moving said valve element comprises:
- a rod connected at one end to said gate valve element and having its other end extending from said housing through a groove formed in said lower plate; and
- packing means around said rod for preventing leakage from said housing.

* * * * *